United States Patent
Wang et al.

(10) Patent No.: US 9,252,851 B2
(45) Date of Patent: Feb. 2, 2016

(54) METHOD AND APPARATUS OF PERFORMING OUTER LOOP LINK ADAPTATION OPERATION

(75) Inventors: Gang Wang, Beijing (CN); Ming Lei, Beijing (CN)

(73) Assignee: NEC (China) Co., Ltd., Beijing (CN)

( * ) Notice: Subject to any disclaimer, the term of this patent is extended or adjusted under 35 U.S.C. 154(b) by 140 days.

(21) Appl. No.: 13/879,242

(22) PCT Filed: Feb. 28, 2011

(86) PCT No.: PCT/CN2011/071407
§ 371 (c)(1),
(2), (4) Date: May 21, 2013

(87) PCT Pub. No.: WO2012/116485
PCT Pub. Date: Sep. 7, 2012

(65) Prior Publication Data
US 2013/0235835 A1   Sep. 12, 2013

(51) Int. Cl.
*H04W 4/00* (2009.01)
*H04B 7/04* (2006.01)
(Continued)

(52) U.S. Cl.
CPC ............ *H04B 7/0417* (2013.01); *H04B 7/0626* (2013.01); *H04L 1/0026* (2013.01); *H04L 5/0057* (2013.01); *H04L 5/0091* (2013.01); *H04W 24/10* (2013.01)

(58) Field of Classification Search
CPC ... H04B 7/0417; H04W 24/10; H04L 5/0057; H04L 5/0091
USPC .......................................................... 370/329
See application file for complete search history.

(56) References Cited

U.S. PATENT DOCUMENTS

| 8,745,468 | B1 * | 6/2014 | Zhang ............... H03M 13/1102 714/701 |
| 2005/0170782 | A1 | 8/2005 | Rong et al. |

(Continued)

FOREIGN PATENT DOCUMENTS

| CN | 1914827 A | 2/2007 |
| CN | 101647223 A | 2/2010 |
| CN | 101933251 A | 12/2010 |

OTHER PUBLICATIONS

International Search Report for PCT/CN2011/071407 dated Dec. 8, 2011.

(Continued)

*Primary Examiner* — Shripal Khajuria
*Assistant Examiner* — Faisal Choudhury
(74) *Attorney, Agent, or Firm* — Sughrue Mion, PLLC

(57) ABSTRACT

The present invention discloses a method and apparatus of performing outer loop link adaptation (OLLA) operation. This method may comprise: accelerating in an initial probing phase, increase of an OLLA scaling factor until obtaining a negative result regarding codeword selection; and fine modifying, in a fine modification phase, the scaling factor using an upturn factor and a downturn factor in response to the result regarding codeword selection so that a channel quality indication, which is modified using the scaling factor, is matched with its actual value. Compared with the prior art, the technical solution as provided in the present invention can quickly modify a CQI to match its actual value, thus this solution may effectively mitigate the CQI mismatch, improve the CQI feedback accuracy, and further enhance the cell throughput performance and frequency utilization.

12 Claims, 6 Drawing Sheets

(51) Int. Cl.
*H04B 7/06* (2006.01)
*H04L 1/00* (2006.01)
*H04W 24/10* (2009.01)
*H04L 5/00* (2006.01)

(56) References Cited

U.S. PATENT DOCUMENTS

2006/0089104 A1    4/2006  Kaikkonen et al.
2008/0240216 A1*  10/2008  Kolding ................ H04L 1/0026
                                                            375/227
2010/0284454 A1*  11/2010  Oteri ................... H03M 13/353
                                                            375/224
2010/0315620 A1*  12/2010  Pimpinella .......... G01M 11/338
                                                            356/73.1
2012/0093061 A1*   4/2012  Charbit .............. H04B 7/15557
                                                            370/315
2012/0294228 A1*  11/2012  Song ..................... H04W 88/04
                                                            370/315
2012/0320783 A1*  12/2012  Wu ....................... H04B 7/0689
                                                            370/252
2013/0265960 A1*  10/2013  Wang ................... H04L 1/0026
                                                            370/329

OTHER PUBLICATIONS

Communication dated Mar. 18, 2015, issued by the State Intellectual Property Office of P.R. China in counterpart Chinese application No. 201180058677.5.

Communication dated Nov. 12, 2015 from the State Intellectual Property Office of the People's Republic of China in counterpart Application No. 201180058677.5.

* cited by examiner

METHOD AND APPARATUS OF PERFORMING OUTER LOOP LINK ADAPTATION OPERATION

FIELD OF THE INVENTION

The present invention relates to the field of mobile communication technology, and more particularly, to a method and an apparatus of performing outer loop link adaptation (OLLA) operation.

BACKGROUND OF THE INVENTION

With the constant increase of mobile data services and emergence of new-type applications such as multimedia online game (MMOG), mobile TV, Web2.0, and stream media, the 3rd Generation Partnership Project (3GPP) organization has developed long-term evolution (LTE) specifications. 3GPP LTE, which is known as an evolution standard of the Global System for Mobile Communications/High Speed Packet Access (GSM/HSPA) technology that has achieved a great success, aims at creating a new series of specifications for the new evolving radio-access technology, so as to go on improving the cellular communication system performance, such as achieving a higher throughput and a lower packet transmission latency.

An LTE system can operate both in Frequency Division Duplex (FDD) mode and Time Division Duplex (TDD) mode. In the FDD mode, the uplink and downlink employ a pair of frequency spectrums for data transmission; while in the TDD mode, the uplink and downlink channels share the same frequency, but occupy different time slots. Therefore, the TDD system has channel reciprocity, by which the downlink wireless channel information could be obtained with the knowledge get from the uplink channel.

FIG. 1A illustrates a typical scenario of a multi-cell LTE/LTE-A/TD-LTE system. As illustrated in FIG. 1A, the LTE system comprises a core network (EPC), base station devices (eNB1 to eNB3) and a plurality of user equipments UE1, UE2, ..., UEn, ..., UEm. It should be noted that although the shown system comprises three cells, it can be more in actual application. User equipment UE transmits data to eNB or receives data therefrom via their wireless interfaces; and respective eNB1 to eNB3 are further connected to the core network EPC.

In a downlink operation of the TDD system, a user equipment (UE) is responsible for measuring the downlink channel and feeding information back to a base station device (eNB) for using by the eNB to perform scheduling and allocating operations. FIG. 1B schematically illustrates a block diagram of a typical single-cell communication system according to the prior art, wherein the system comprises a plurality of UEs that communicate with an eNB. As illustrated in FIG. 1B, to enable the UE to fully appreciate the downlink channel, eNB transmits a cell specific reference signal (CRS) to the UE in some certain time and frequency combination resources (also called resource element RE) in the LTE system. The CRS is a pre-defined signal, pre-known to both the transmitter and the receiver; therefore, the UE can derive the downlink channel condition based on the received CRS. The CRS is not pre-coded and is transmitted over the entire system bandwidth of a cell. A data receiving unit 101 in the UE is for receiving CRS/data. A feedback calculation unit 102 is for measuring a feedback parameter, for example estimating a channel quality indication (CQI) based on the CRS. The feedback calculation unit 102 in the UE can calculate the CQI based on the channel information on some valid sub-frames, so as to obtain the CQI based on a PDSCH transmission scheme configured by a transmission mode (TM). For example, for mode 7 and mode 8 (hereinafter referred to as TM7 and TM8, respectively), if the number of PBCH antenna ports is one, then a single port solution is adopted; while if the number of PBCH antenna ports is more than one, then transmit diversity is adopted. A feedback transmission unit 103 is for transmitting to the eNB feedback information such as CQI, Pre-coding Matrix Information (PMI), Rank Indication (RI), etc. At the eNB, a scheduler unit 111 performs resource scheduling to each UE based on feedback information from the UE. Then, an allocation processing unit 112 performs channel resource allocation processing.

Besides, thanks to the channel reciprocity feature in the TDD system, it is possible for LTE to enable better performance for radio resource control and advanced antenna techniques. For example, in coverage limited areas like rural area, beamforming is one of the most effective ways to provide coverage extension and to reduce the number of cell sites. The enhanced signal strength to noise ratio allows more margins for UE decoding the data symbols, and the more efficient Modulation Coding and Scheme could be used to improve the spectrum efficiency. Further, in LTE release 8 and 9, single layer and dual layer beamforming on antenna port 5 and 7, 8 are already supported.

FIG. 1C schematically illustrates a flowchart of beamforming operation according to existing specifications. As illustrated in FIG. 1C, this operation mainly comprises beamforming weight and CQI acquirement process and beamforming and link adaptation process, which are illustrated by two big dashed blocks. As illustrated in the figure, at step S101, the UE transmits an uplink channel sounding reference signal (SRS) to the eNB. At step S102, the eNB obtains the channel state indication (CSI) information through the SRS information and calculates a beamforming weight based on the CSI information. At step S103, the UE obtains the CQI based on the CRS from the eNB and transmits the CQI to the eNB. At step S104, the eNB obtains the CQI. Then, at step S105, the eNB performs pre-coding and link adaptive operation based on the calculated beamforming weight and CQI indication. After that, at step S106, pre-coded data symbols and a UE specific reference signal (UE-RS) that is pre-coded in the same manner as those data symbols are transmitted to the UE. At step S107, after receiving the UE-RS, the UE performs demodulation on the received data symbols based on the received UE-RS.

The beamforming operation is based on non-codeword pre-coding and relies on the UE-RS for data demodulation. Because the UE-RS symbol is pre-coded with the same pre-coding matrix as the downlink data symbols, the UE can estimate out an effective channel. However, the UE-RS is transmitted only when the UE is being scheduled, and is therefore only transmitted over the frequency resource assignment of data transmission and can not be used as the resource for measuring the CQI by the UE. Therefore, it is based on the CRS assuming transmit diversity that the UE calculates the CQI, while the downlink data symbols are transmitted based on transmit beamforming. Therefore there is a CQI difference between the UE reported CQI and the actual CQI. Such CQI difference is actually a CQI difference between the transmit diversity and the transmit beamforming, or a CQI difference between CRS and UE-RS. Therefore, if eNB uses the UE reported CQI to transmit data, then the gain due to adopting beamforming will be lost, which directly causes degradation of the throughput performance. Therefore, there is a need for a scheme for performing CQI modification so as to mitigate the CQI difference.

To compensate for the CQI difference between the UE reported CQI and an actual CQI, an outer loop link adaptation scheme is disclosed by K. I. Pedersen, F. Frederiksen, T. E. Kolding, T. F. Lootsma, and P. E. Mogensen in an article entitled "*Performance of high-speed downlink packet access in Coexistence with dedicated channels*", Trans. on VT, VOL. 56. NO. 3, May 2007. This scheme is a universal technical solution, that is to say, it can be used for either uplink or downlink. Hereinafter, a CQI measurement process using OLLA will be described with an OLLA for the downlink at UE side.

FIG. 2 illustrates a flowchart of a CQI measurement method performed in a CQI measurement unit (as illustrated in FIG. 1B) at the UE. As illustrated in FIG. 2, first at step S201, the CQI measurement unit 202 calculates SINR based on CRS received by a data receiving unit 201. Then, at step 202, OLLA operation is performed on SINR so as to perform CQI modification by adding an OLLA scaling factor A to the SINR, wherein detailed description regarding calculation of the scaling factor will be described hereinafter with reference to FIG. 3. Next, at step S203, the modified SINR is mapped to the CQI according to an SINR-CQI look-up table. The resulting CQI is transmitted to the eNB through a feedback transmitting unit 103.

FIG. 3 illustrates a flowchart of performing OLLA operation on the SINR. As illustrated in FIG. 3, first at step S301, a scaling factor A of the OLLA operation is initialized to be 0. Then, at step S302, codeword selection operation is performed based on the reported CQI, and then the method proceeds to step S303. If it is determined at step S303 that the codeword is successfully received, then at step S304, the scaling factor is increased by $A_{up}$ dB; next, the method returns to step S302 to continue selection of codeword. If, at step S303, it is determined that the codeword is not successfully received, then at step S305, the scaling factor is decreased by $A_{down}$ dB; next, the method returns to step S302 to continue selection of codeword. Further, it should be noted that such CQI adjustment may also be performed at eNB which may modify the OLLA scaling factor using an upturn factor $A_{up}$ or a downturn factor $A_{down}$ based on an ACK or NACK from the UE regarding whether the codeword is successfully received.

Besides, according to the OLLA scheme, the ratio of $A_{down}$ to $A_{up}$ is at least 9 in order to keep the block error probability (BLEP) within a predetermined threshold (in an actual application scenario, usually 0.1). In the actual application scenario, $A_{up}=0.05$, while $A_{down}=0.45$.

Therefore, OLLA is a simple but robust universal scheme. However, this modification is done by increasing or decreasing SINR/CQI based on an ACK/NACK feedback regarding codeword selection. Generally, it will take a long time to realize matching between a reported CQI and an actual CQI, especially when there is a bigger difference between an SINR estimated based on CRS and an actual SINR. Further, it is more susceptible to error. Once error occurs, it will significantly affect this modification and greatly prolong the time for modification. As a result, it will cause degradation of system performance.

Therefore, there is urgently needed an improved CQI modification scheme in the art.

SUMMARY OF THE INVENTION

In view of the above, the present invention provides a solution for enhancing OLLA operation so as to solve or at least partially mitigate at least a part of problems in the prior art.

According to an aspect of the present invention, there is provided a method of performing outer loop link adaptation operation. This method may comprise: accelerating, in an initial probing phase, increase of a scaling factor for the outer loop link adaptation operation until obtaining a negative result regarding codeword selection; and fine modifying, in a fine modification phase, the scaling factor using an upturn factor and a downturn factor in response to the result regarding codeword selection, so that the channel quality indication, which is modified using the scaling factor, is matched with its actual value.

According to a preferred embodiment of the present invention, in the fine modification phase, decrease of the scaling factor may be accelerated in response to a plurality of negative results regarding the codeword selection.

According to another preferred embodiment of the present invention, it enters into the fine modification phase when the scaling factor reaches an initial probing threshold in the initial probing process.

According to a further preferred embodiment of the present invention, the initial probing threshold may be updated to the modified scaling factor during the fine modification phase.

According to a still further preferred embodiment, the upturn factor and the downturn factor can be selected to satisfy a predetermined bit error rate.

According to a yet further preferred embodiment, speed of increase of the scaling factor may be controlled by a fast upturn coefficient.

According to a further preferred embodiment, speed of decrease of the scaling factor may be controlled by a fast fine modification coefficient.

According to another aspect of the present invention, there is further provided an apparatus of performing outer loop link adaptation operation. The apparatus may comprise: initial probing means configured to, in an initial probing phase, accelerate increase of a scaling factor for the outer loop link adaptation operation until obtaining a negative result regarding codeword selection; and fine modification means configured to fine modify, in a fine modification phase, the scaling factor using an upturn factor and a downturn factor in response to the result regarding codeword selection so that a channel quality indication, which is modified using the scaling factor, is matched with its actual value.

According to the technical solution of the present invention, this enhanced OLLA operation comprises two phases, i.e., an initial probing phase, and a fine modification phase. In the initial probing phase, the SINR may quickly reach the order of magnitude of an actual SINR, while in the fine modification phase, the SINR may be modified by a relatively smaller upturn factor and downturn factor, so as to allow it to match the actual SINR, thereby enabling the SINR to quickly approach to the actual SINR in a relatively short time. Therefore, by using the operation scheme of the present invention, the CQI mismatch problem may be effectively improved, the CQI feedback accuracy may be improved, and therefore cell throughput performance and frequency utility may be enhanced.

BRIEF DESCRIPTION OF THE DRAWINGS

The above and other features of the present invention will become more apparent through detailed description of the embodiments taken in conjunction with the accompanying drawings in which like reference signs indicate like or similar components. In the accompanying drawings, FIG. 1A schematically illustrates a typical multi-cell LTE/LTE-A/TD-LTE network according to the prior art.

DETAILED DESCRIPTION OF PREFERRED EMBODIMENTS

Hereinafter, reference will be made to the accompanying drawings to describe a method and an apparatus for performing OLLA operation as provided by the present invention in detail through preferred embodiments. It should be understood that these embodiments are presented only to enable those skilled in the art to better understand and implement the present invention, not intend for limiting the scope of the present invention in any manner.

It should be first noted that in this invention is illustrated particular sequences for performing the steps of the methods. However, these methods are not necessarily performed strictly according to the illustrated sequences, and they can be performed in reverse sequence or simultaneously based on natures of respective method steps.

Herein, the terms "channel quality indication (CQI)" and "Signal to Interference plus Noise Ratio (SINR)" are used. In view of the fact that SINR and CQI have a mapping relationship therebetween, the SINR and CQI have an equivalent meaning in this invention. Moreover, "SINR" and "CQI" are usually exchangeable herein.

Figure 1A:
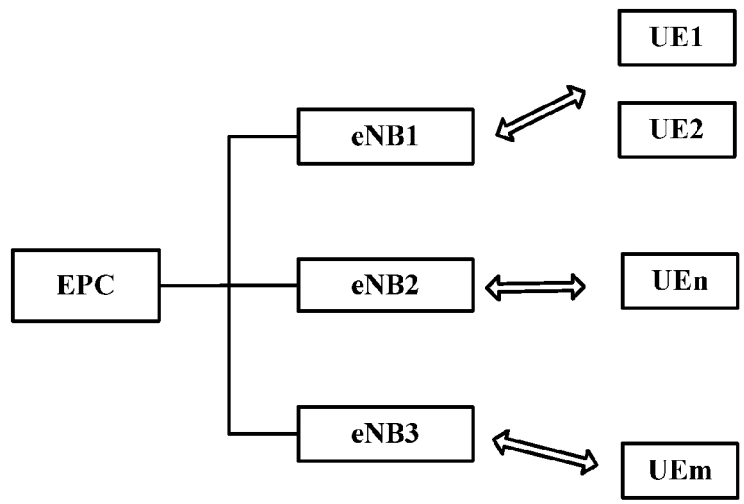
FIG. 1B schematically illustrates a block diagram of a typical single-cell communication system comprising a plurality of UEs that communicate with an eNB according to the prior art.
FIG. 1C schematically illustrates a flowchart of beamforming operation according to existing specifications.
Figure 1B:
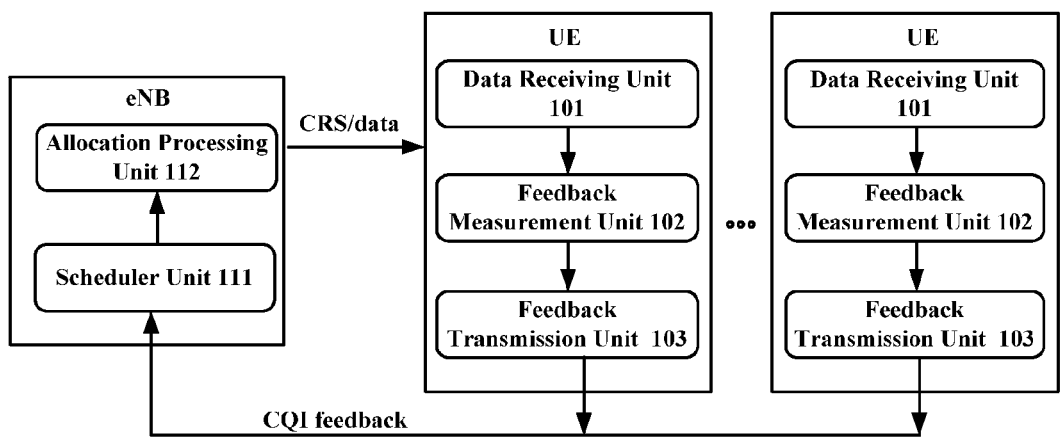
Figure 1C:
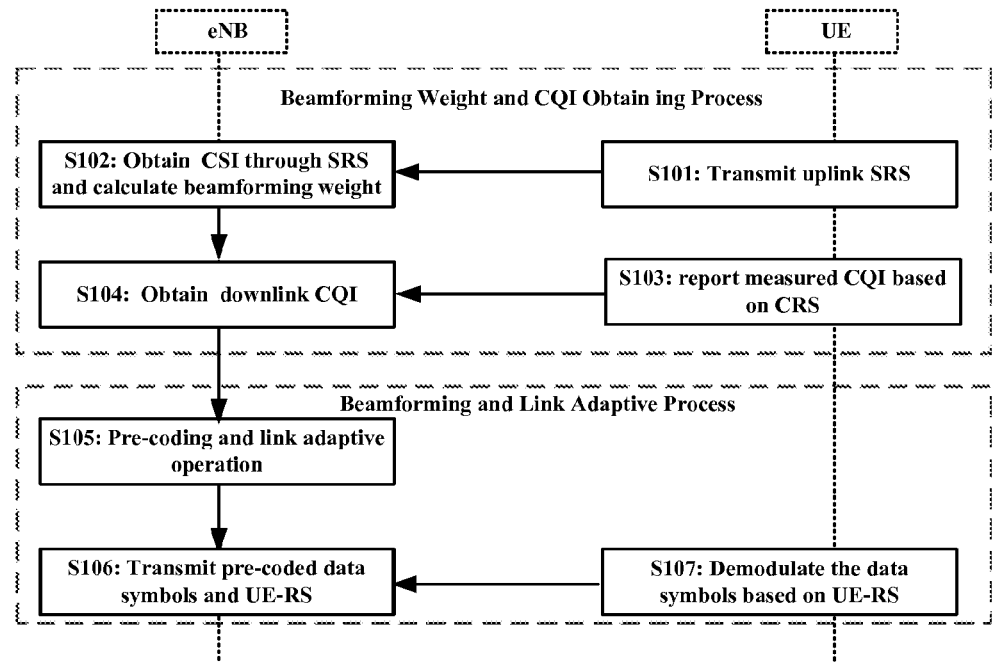
Figure 2:
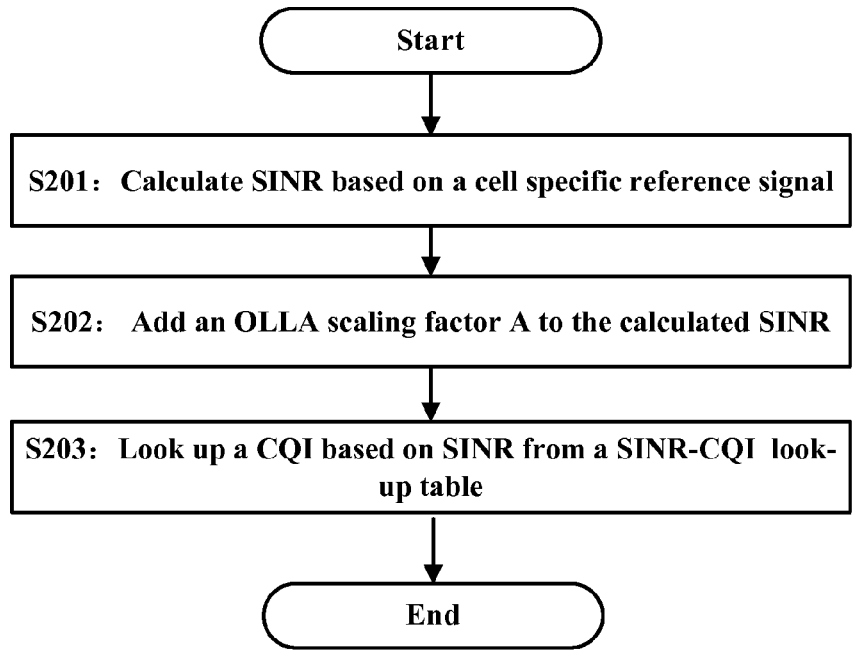
FIG. 2 illustrates a flowchart of an outer loop link adaptation (OLLA) operation according to the prior art.
Figure 3:
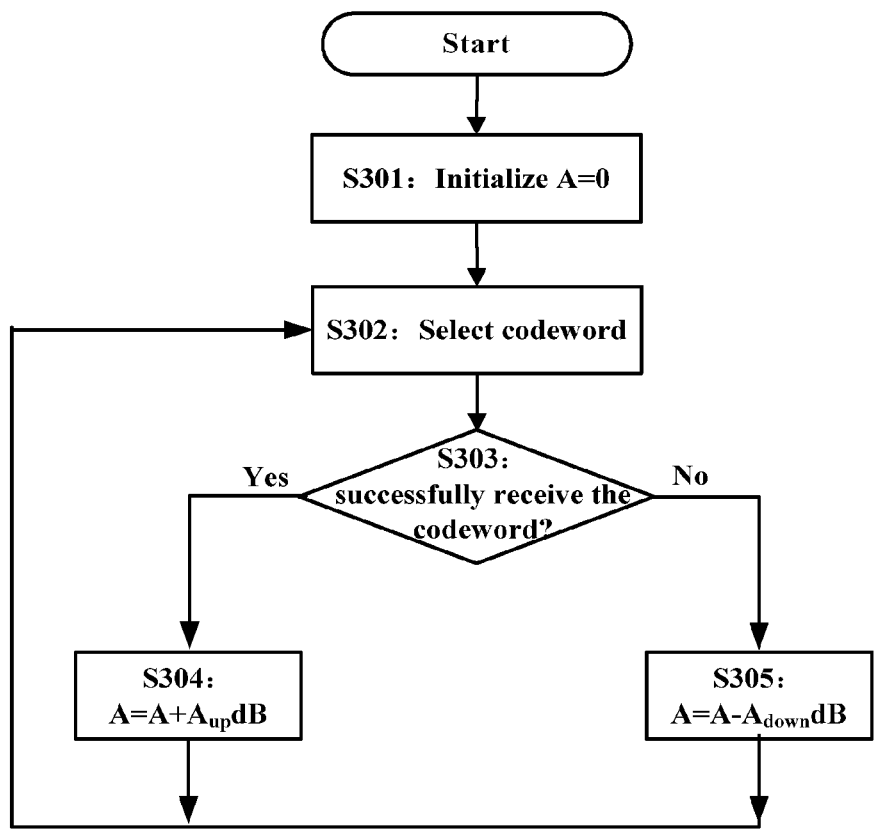
FIG. 3 illustrates a flowchart of calculating an OLLA scaling factor according to the prior art.
Figure 4:
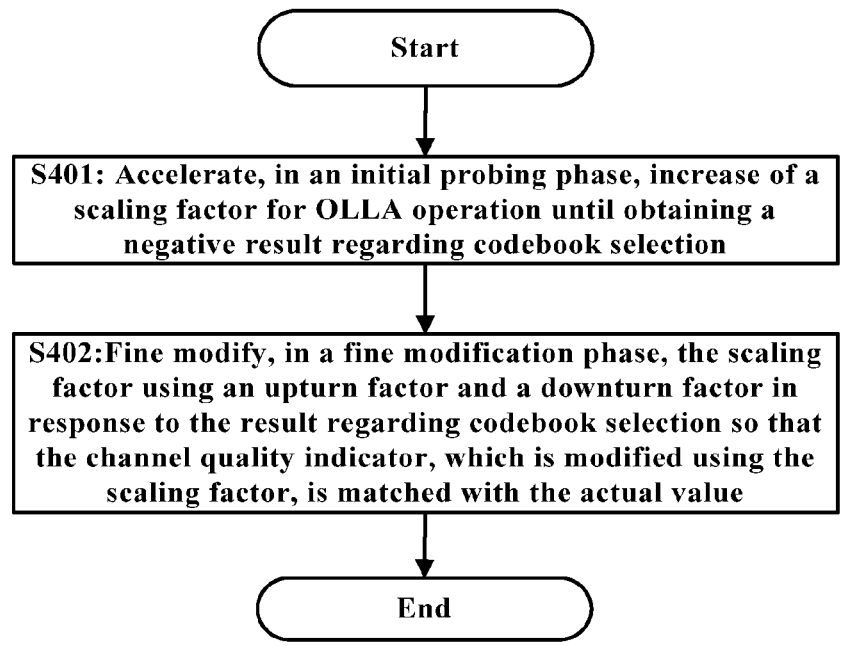
FIG. 4 schematically illustrates a flowchart of a method for performing OLLA operation according to an embodiment of the present invention.

Next, FIG. 4 will be referenced to describe a flowchart of a method for performing OLLA operation according to an embodiment of the present invention.

As illustrated in FIG. 4, first at step S401, in an initial probing phase, increase of OLLA scaling factor is accelerated until obtaining a negative result regarding codeword selection.

As previously mentioned, the CQI modification process is very slow when a conventional OLLA operation is used. It is particularly so when a greater difference exists between a SINR as estimated based on CRS and an actual SINR. For example, in the case that downlink data transmission employs the beamforming technology, the difference between SINR calculated by UE based on CRS and the actual SINR is as high as 5 dB, thus SINR will usually approach to match the actual SINR after selecting nearly 100 codewords.

Therefore, the inventors of the present invention propose an improved OLLA operation method, which is also called enhanced OLLA or fast OLLA. A basic idea of this method is to divide OLLA into two phases, i.e., an initial probing phase, and a fine modification phase. Because this initial probing phase is the phase during which a fast probing is done, it may also be called a fast probing phase. During this phase, the OLLA scaling factor is rapidly increased so as to find an order of magnitude of an actual SINR in a short time. While in the fine modification phase, the OLLA scaling factor is modified in a very small step, such that the modified SINR gradually matches the actual SINR in a more accurate manner.

According to embodiments of the present invention, in the initial phase of SINR modification, the increase of scaling factor may be accelerated until obtaining a negative result regarding codeword selection. For example, in the initial probing phase, the UE first uses an OLLA scaling factor A to modify the SINR, and then the modified SINR is mapped to a corresponding CQI which is then returned to eNB. The eNB selects a codeword based on a reported CQI and performs downlink data transmission. If the UE can successfully receive the codeword, then the speed of increasing the OLLA scaling factor will be raised. Actually, whether UE can successfully receive the codeword is an indication on whether the codeword selected at the base station device can be successfully transmitted over the current downlink channel. According to an embodiment of the present invention, this scaling factor A may be modified to be a times thereof, i.e., A+A*a, where a is a fast upturn coefficient for controlling the speed of increase of the scaling factor, which may be any proper value greater than 1, preferably 2. Next, the SINR modified with the scaling factor A is mapped to CQI which is then transmitted to the eNB, so as to perform codeword selection. This process is repeated until the UE finds that the codeword is not successfully received. At this point, the initial probing process is terminated, and the method enters into the subsequent slow fine modification phase.

In a preferred embodiment, an initial probing threshold Th may be further set for controlling the initial probing process. In this embodiment, if the OLLA scaling factor A reaches (for example greater than or equal to) the initial probing threshold, then the method likewise enters into the fine modification phase. This initial probing threshold Th is a threshold for terminating the initial probing phase. This initial probing threshold should be selected to be a proper value, which should be enough big to accelerate the procedure of finding the order of magnitude of an actual SINR, and on the other hand, should not be too big, otherwise the subsequent fine modification procedure will be unnecessarily prolonged. This value may be selected dependent on different applications, for example based on an empirical value, or determined through system simulation or actual experiment.

Next, after the initial probing process is terminated, the method enters into step S402, i.e., the fine modification phase during which an upturn factor and a downturn factor are used to perform fine modification to the scaling factor in response to the result regarding codeword selection, such that the channel quality indicator modified with the scaling factor is matched with the actual value thereof.

In this fine modification phase, if it is determined that the codeword cannot be successfully received, it means the currently determined SINR is greater than the actual SINR, and thus it is needed to slightly decrease the OLLA scaling factor. For example, the scaling factor A may be decreased by $A_{down}$ dB, namely $A=A-A_{down}$. Then, this procedure is repetitively performed.

If it is determined that the codeword is successfully received, it means that the currently determined SINR is smaller than the actual SINR and thus it is needed slightly increase the OLLA scaling factor. For example, the scaling factor A may be increased by $A_{up}$ dB, namely $A=A+A_{up}$. Then, this procedure continues to perform until the A value is substantially stabilized within a proper range.

During the initial probing process, because the upturn speed of the OLLA scaling factor is quite rapid, it is likely that the modified SINR greatly exceeds the actual SINR. Therefore, preferably in the fine modification procedure, downturn speed of the scaling factor increases when it is found that the codeword cannot be successfully received many times, so as to accelerate the downturn process. For example, let $A=A-A_{down}*b$, where b denotes the fast fine modification coefficient, for controlling the speed of decreasing the scaling factor, which may be any proper value greater than 1, preferably 2. Or alternatively, $A_{down}=A_{down}*b, A=A-A_{down}$. However, it should be noted that though the downturn speed of the scaling factor A may be raised in the fine modification phase, this procedure still belongs to the fine modification phase, because from the perspective of modification strength, this downturn still belongs to a fine modification compared with upturning in the fast procedure. Actually, in the fine modification phase, in the case that the codewords have been successfully received for many times, it is also possible to accelerate the speed of increasing the OLLA scaling factor; and it may also be controlled by a same fast fine modification coefficient or by another different fast fine modification coefficient.

Besides, in an embodiment in which the initial probing threshold Th is used, in order to overcome the system stability problem caused by the OLLA operation that returns to the initial probing process after entering into the fine modification phase, the initial probing threshold Th may be modified during the fine modification phase. For example, after each time of modifying the OLLA scaling factor, the fast modification threshold Th is updated to be the modified OLLA scaling factor. Therefore, even the operation enters into the upturn procedure of the OLLA scaling factor, the initial probing procedure will not be performed again due to the scaling factor being less than the OLLA threshold. Accordingly, the OLLA operation may be better controlled, with a higher adaptation efficiency achieved, thereby further improving the cell throughput performance and frequency utilization.

Besides, more preferably, bit error management may also be performed in this fine modification phase. In other words, the upturn factor and downturn factor are selected to satisfy a predetermined bit error rate, respectively. As currently required, the bit error rate should be maintained below 10% (i.e., 0.1). It is known that the bit error rate BLEP and the upturn factor and the downturn factor satisfy the following equation:

$$BLEP = \frac{1}{1+\frac{A_{down}}{A_{up}}} \quad \text{Equation (1)}$$

Therefore, it is quite clear that the downturn factor $A_{down}$ should be at least 9 times the upturn factor $A_{up}$ as currently required. The downturn factor $A_{down}$ and the upturn factor $A_{up}$ may be set to 0.45 and 0.05 as a conventional OLLA, respectively, but it should be appreciated that they may be set to any other proper values. In addition, it should be further noted that the present invention is not limited to 9 times here; on the contrary, this multiple will vary with the requirement on bit error rate.

Figure 5:
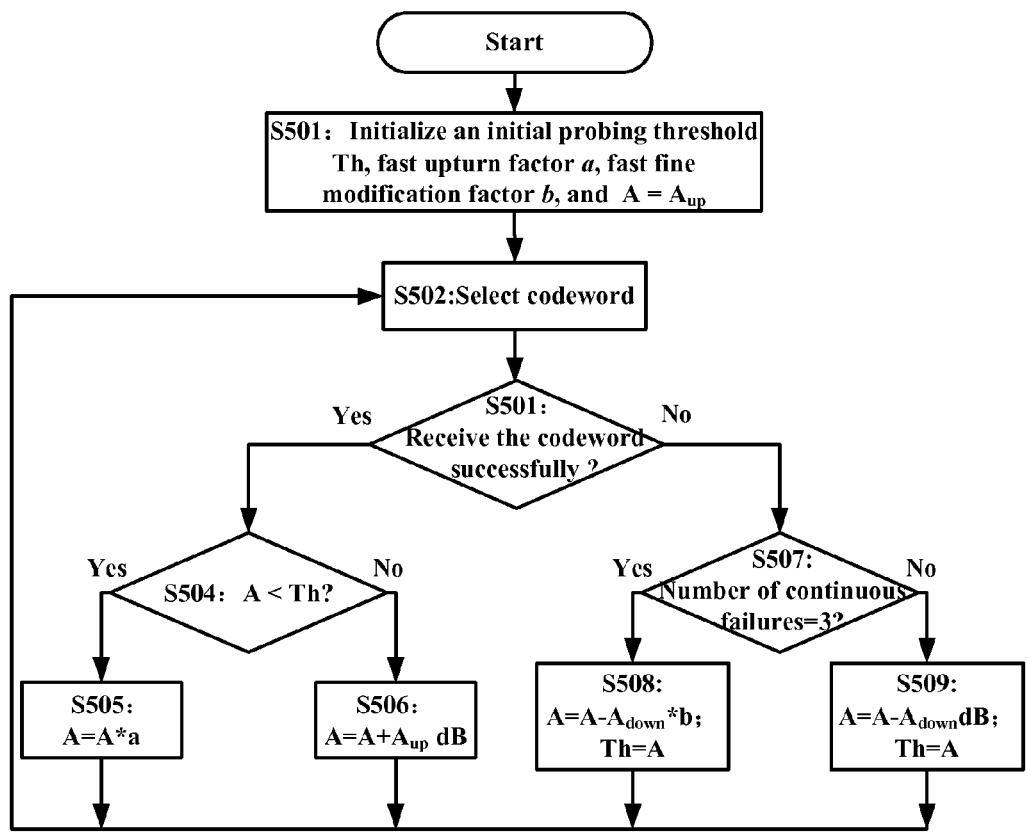
FIG. 5 schematically illustrates an exemplary flowchart of a particular implementation for performing OLLA operation according to an embodiment of the present invention.

Next, FIG. 5 will be referenced to describe a particular implementation of OLLA operation according to a preferred embodiment of the present invention.

As illustrated in FIG. 5, first at step S501, an initialization operation is performed. For example, the initial probing threshold Th, the fast upturn coefficient a, the fast fine modification coefficient b may be set, and the initial value of the scaling factor A may also be set. For example, the initial probing threshold Th may be set to 5 dB, and the fast upturn coefficient a and the fast fine modification coefficient b may be set to 2, while the initial value of the scaling factor is set to be the upturn factor $A_{up}$ that is used in the fine modification. However, it should be noted that the present invention is not limited thereto, but that these parameters may be set to any proper values.

Then, after mapping the SINR that is initially modified with the scaling factor into CQI based on an SINR-CQI look-up table, UE will feed the CQI back to the eNB; at step S502, the eNB selects a codeword based on the CQI and transmits it to the UE. If at step S503, it is determined that the UE can successfully receives the codeword, then the process proceeds to step S504 to modify the OLLA scaling factor, for example, modifying the scaling factor A to be a times of the current value, namely, $A=A*a$. Next, the SINR is modified using the modified scaling factor, and the corresponding CQI is transmitted to eNB. Finally, the process returns to step S502 to continue operation.

Through such repetitively fast increasing the value of A, the value of the scaling factor A may reach the initial probing threshold Th. In this case, the method proceeds from step S504 to step S506 in which the OLLA scaling factor is modified up with a smaller upturn factor $A_{up}$, for example $A=A+A_{up}dB$, wherein $A_{up}$ is for example 0.05 in the prior art, or any other proper value.

If after repetitively increasing the value of A, it is determined at step S503 that the codeword cannot be successfully received, then the method proceeds to step S507, i.e., entering into the downturn process. At step S507, it may be determined that whether codewords have been unsuccessfully received continuously, for example, whether the failure times is greater than 3. However, the present invention is not limited thereto. The failure times may be other proper values, for example 2, 4 or the like.

If at step S507, the result of determining is negative, then the current OLLA scaling factor is decreased by $A_{down}$, i.e., $A=A-A_{down}$. And preferably, the initial probing threshold is modified to the updated scaling factor A, such that the whole process maintains a good stability and convergence. On the other hand, if the determining result is positive, then the current OLLA scaling factor is decreased by b times of $A_{down}$, namely, $A=A-A_{down}*b$, so as to accelerate the downturn process, such that the SINR approaches to the actual SINR value more quickly.

Figure 6:
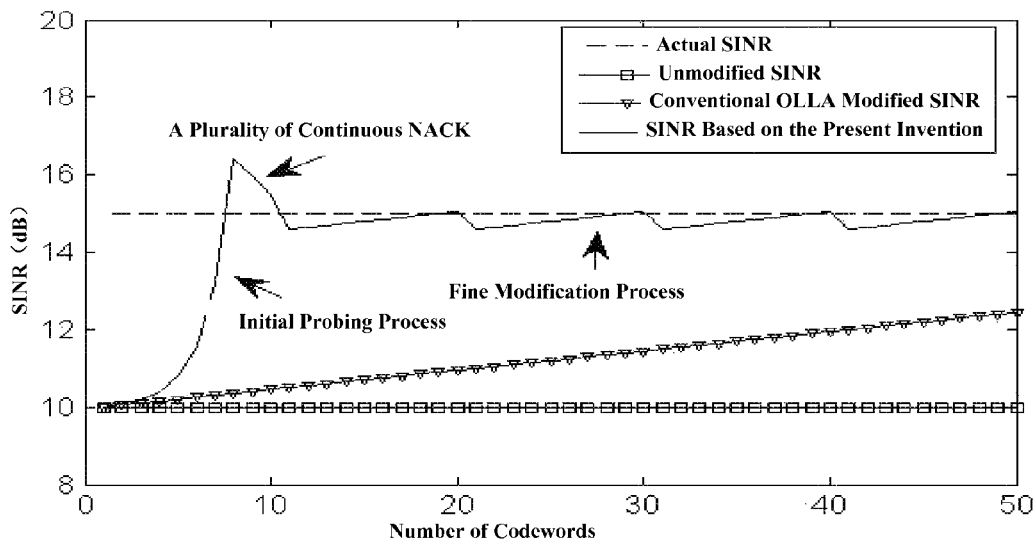
FIG. 6 schematically illustrates a diagram of SINR changes according to an OLLA method of the present invention and a conventional OLLA method.

According to the embodiments of the present invention, through modifying the OLLA scaling factor by combining the initial probing phase and the fine modification phase, the SINR can be quickly modified to match the actual SNR in a short time. FIG. 6 schematically illustrates a diagram of SINR changes according to the fast OLLA scheme of to the present invention and according to a conventional OLLA method.

From FIG. 6, it can be clearly seen that the difference between an unmodified SINR and an actual SINR is about 5 dB. According to the fast OLLA scheme of the present invention, the initial probing process may be completed after about 10 codewords, while after another 10 codewords, the UE reported SINR has substantially matched its actual value. However, according to a conventional OLLA approach, at least before 50 codewords, it is still in a process of slowly increasing SINR.

Figure 7A:
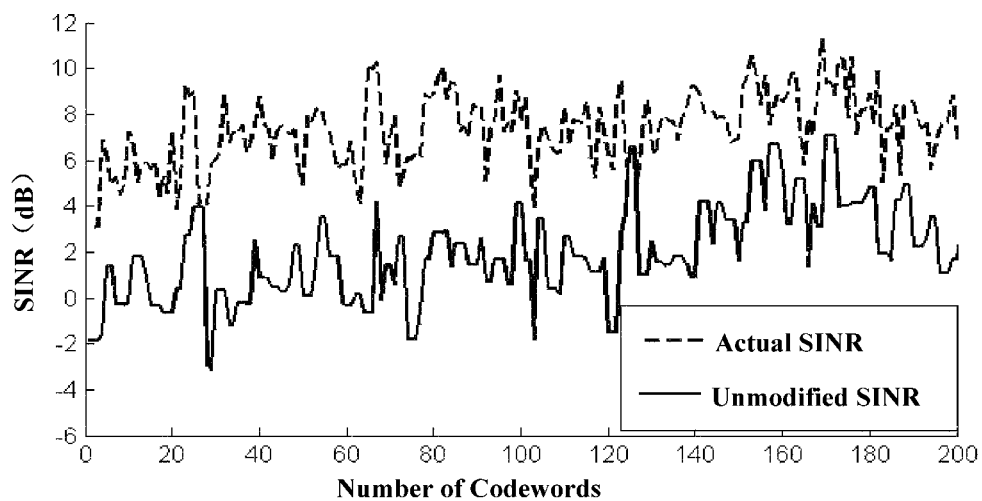
FIGS. 7A to 7C illustrate results of simulating SINR changes without adopting any modification solution, with a conventional OLLA scheme, and with a fast OLLA according to the present invention.
Figure 7B:
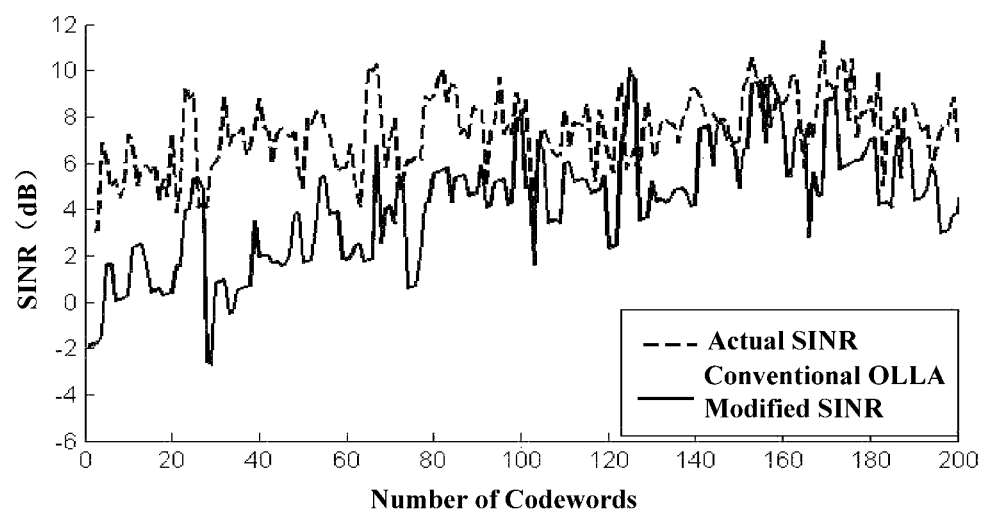
Figure 7C:
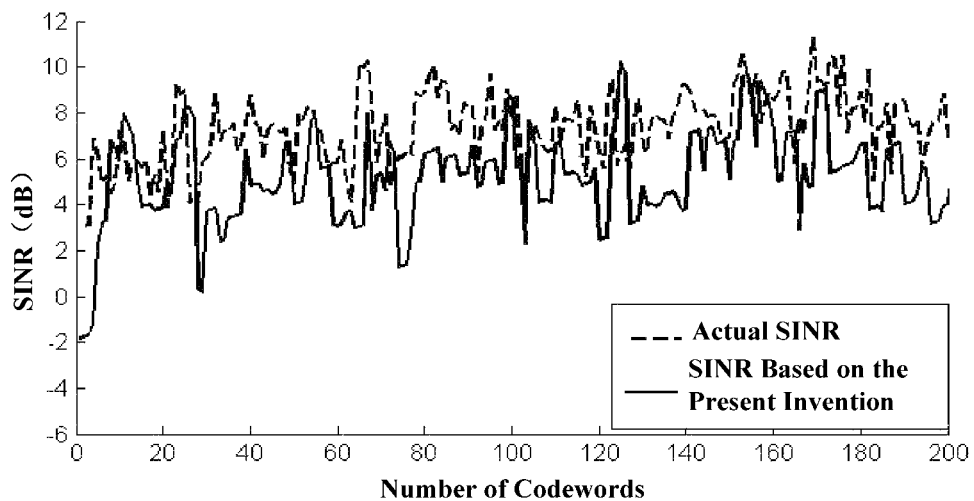

Besides, the inventors of the present invention also carry out a simulation to SINR changes of a randomly selected UE without adopting any modification plan, with a conventional OLLA scheme, and with the fast OLLA of the present invention. FIGS. 7A to 7C schematically illustrate the results of this simulation.

As illustrated in FIG. 7A, there is a great gap between a curve of unmodified SINR and a curve of an actual SINR; as illustrated in FIG. 7B, the curve of SINR adopting the conventional OLLA approach gradually matches the actual SINR after 100 codewords; and as illustrated in FIG. 7C, it is a sharp contrast from the curve of the unmodified SINR and the curve of the SINR modified with the conventional OLLA that the SINR based on the fast OLLA modification of the present invention substantially matches the actual SINR after about 10 codewords.

Therefore, it can be seen that, compared with the prior art, the fast OLLA scheme of the present invention can quickly modify a channel quality indication CQI or an SINR to match its actual value, thus this scheme may effectively mitigate the CQI mismatch, improve the CQI feedback accuracy, and further enhance the cell throughput performance and frequency utilization. In addition, the fast OLLA of the present invention is a universal CQI modification scheme that is suitable for effectively compensating a CQI mismatch caused by any reasons.

Additionally, the present invention further provides an apparatus for performing OLLA operation. Hereinafter, the apparatus will be described in detail with reference to FIG. 8 which illustrates an apparatus 800 for performing OLLA operation according to an embodiment of the present invention.

Figure 8:
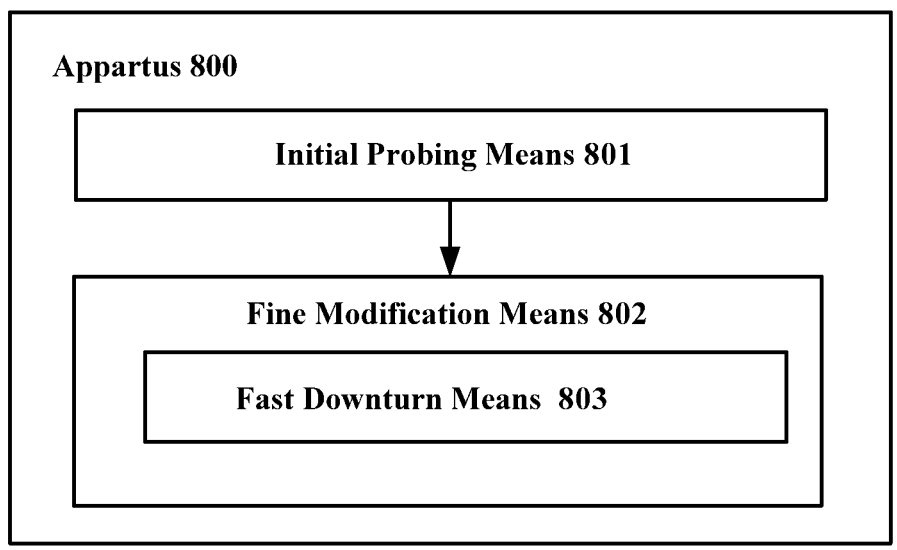
FIG. 8 schematically illustrates a block diagram of an apparatus for performing OLLA operation according to an embodiment of the present invention.

As illustrated in FIG. 8, the apparatus 800 comprises initial probing means 801 and fine modification means 802. The initial probing means 801 is configured to accelerate, in an initial probing phase, increase of the OLLA scaling factor until obtaining a negative result regarding codeword selection. The fine modification means 802 is configured to fine modify, in a fine modification phase, the scaling factor using an upturn factor and a downturn factor in response to the result regarding codeword selection so that the channel quality indication, which is modified using the scaling factor, is matched with its actual value.

In a preferred embodiment according to the present invention, the fine modification means 802 further comprises a fast downturn means 803 configured to accelerate, in the fine modification phase, decrease of the scaling factor in response to a plurality of negative results regarding codeword selection.

In another preferred embodiment according to the present invention, the initial probing means 801 is configured to enter into the fine modification phase when the scaling factor reaches the initial probing threshold during the initial probing process.

In a further preferred embodiment according to the present invention, the fine modification means 802 is further configured to update the initial probing threshold to the modified scaling factor during the fine modification phase.

In a still further preferred embodiment according to the present invention, the upturn factor and the downturn factor are selected to satisfy a predetermined bit error rate.

In a yet further preferred embodiment according to the present invention, the initial probing means 801 is configured to control a speed of increase of the scaling factor by a fast upturn coefficient.

In a still further preferred embodiment according to the present invention, the fine modification means 802 is configured to control a speed of decrease of the scaling factor by a fast fine modification coefficient.

It should be noted that operations of respective means as comprised in the apparatus 800 substantially correspond to respective method steps as previously described. Therefore, for detailed operations of respective means in the apparatus 800, please refer to the previous description on the method of the present invention with reference to FIGS. 4 to 7.

By far, the present invention has been described with reference to the accompanying drawings through particular preferred embodiments. However, it should be noted that the present invention is not limited to the illustrated and provided particular embodiments, but various modification can made within the scope of the present invention. For example, it has been described hereinbefore that during the initial probing process, the OLLA scaling factor A is modified to a times of the current scaling factor A; however, other manners may also be used to rapidly increase this scaling factor, for example, in lieu of or in addition to, the value of fast downturn efficient a may be increased. In addition, in lieu of or in addition to, the value of efficient b may also be increased with the increase of failure times. Moreover, the initial A may also be set to any other proper value than $A_{up}$.

In addition, in embodiments of the present invention, an embodiment wherein the OLLA operation is performed at UE has been described. However, those skilled in the art may understand the OLLA operation may also be performed at eNB. The difference from performing the method at UE is that the eNB, after receiving the UE reported CQI, performs modification to the CQI based on the ACK or NACK regarding whether the codewords have been successfully received as fed back from the UE.

Besides, what has been mainly described is CQI mismatch problem caused by beamforming technology. However, the present invention is actually a universal method that is suitable for solving the mismatch problem between the reported CQI and actual CQI caused by any reasons.

Further, in the embodiments according to the present invention, the technical solution according to the present invention is described mainly referring to LTE releases 8 and 9. However, it should be noted that the present invention is also applicable to any old LTE versions or future developed versions or other similar systems that have similar problems.

In the present invention, the technical solution has been described in combination with eNB. However, actually, besides eNB, the present invention is also applicable to any base station that has a similar problem.

Further, the embodiments of the present invention can be implemented in software, hardware or the combination thereof. The hardware part can be implemented by a special logic; the software part can be stored in a memory and executed by a proper instruction execution system such as a microprocessor or a dedicated designed hardware. Those normally skilled in the art may appreciate that the above method and system can be implemented with a computer-executable instructions and/or control codes contained in the processor, for example, such codes provided on a bearer medium such as a magnetic disk, CD, or DVD-ROM, or a programmable memory such as a read-only memory (firmware) or a data bearer such as an optical or electronic signal bearer. The apparatus and its components in the present embodiments may be implemented by hardware circuitry, for example a very large scale integrated circuit or gate array, a semiconductor such as logical chip or transistor, or a programmable hardware device such as a field-programmable gate array, or a programmable logical device, or implemented by software executed by various kinds of processors, or implemented by combination of the above hardware circuitry and software, for example by firmware.

Though the present invention has been depicted with reference to the currently considered embodiments, it should be appreciated that the present invention is not limited the disclosed embodiments. On the contrary, the present invention is intended to cover various modifications and equivalent arrangements falling within in the spirit and scope of the appended claims. The scope of the appended claims is accorded with broadest explanations and covers all such modifications and equivalent structures and functions.

What is claimed is:

1. A method of performing outer loop link adaptation OLLA operation by at least one hardware processor coupled to a computer storage storing program code, the at least one hardware processor configured to read said program code and programmed to execute the method comprising:
   accelerating, in an initial probing phase, increase of a scaling factor for the OLLA operation until obtaining a negative result regarding codeword selection;
   fine modifying, in a fine modification phase, the scaling factor using an upturn factor and a downturn factor in response to the result regarding codeword selection so that a calculated value of a channel quality indication is modified using the scaling factor to match with an actual value of the channel quality indication, wherein the fine modification phase is entered when the scaling factor reaches an initial probing threshold during the initial probing phase; and
   updating the initial probing threshold to the modified scaling factor in the fine modification phase.

2. The method according to claim 1, further comprising:
   accelerating, in the fine modification phase, decrease of the scaling factor in response to a plurality of times of negative results regarding codeword selection.

3. The method according to claim 2, wherein a speed of decrease of the scaling factor is controlled through a fast fine modification coefficient.

4. The method according to claim 1, wherein the upturn factor and the downturn factor are selected to satisfy a predetermined bit error rate.

5. The method according to claim 1, wherein a speed of increase of the scaling factor is controlled through a fast upturn coefficient.

6. The method according to claim 1, the fine modification phase operation starts only after the completion of the initial probing phase.

7. An apparatus for performing Outer Loop Link Adaptation (OLLA) operation, comprising:
   a computer storage operable to store program code; and
   at least one hardware processor coupled to the computer storage to read said program code and programmed to:
   accelerate, in an initial probing phase, increase of a scaling factor for the OLLA operation until obtaining a negative result regarding codeword selection;
   fine modify, in a fine modification phase, the scaling factor using an upturn factor and a downturn factor in response to the result regarding codeword selection so that a calculated value of a channel quality indication is modified using the scaling factor to match with an actual value of the channel quality indication, wherein the fine modification phase is entered when the scaling factor reaches an initial probing threshold during the initial probing process; and
   update the initial probing threshold to the modified scaling factor in the fine modification phase.

8. The apparatus according to claim 7, wherein the at least one hardware processor is further configured to:
   accelerate, in the fine modification phase, decrease of the scaling factor in response to a plurality of times of negative results regarding codeword selection.

9. The apparatus according to claim 8, wherein the at least one processor is further configured to control a speed of decrease of the scaling factor through a fast fine modification coefficient.

10. The apparatus according to claim 7, wherein the upturn factor and the downturn factor are selected to satisfy a predetermined bit error rate.

11. The apparatus according to claim 7, wherein the at least one processor is further configured to control a speed of increase of the scaling factor through a fast upturn coefficient.

12. The apparatus according to claim 7, the fine modification phase operation starts only after the completion of the initial probing phase.

* * * * *